United States Patent [19]

Loconsolo et al.

[11] Patent Number: 4,981,554

[45] Date of Patent: Jan. 1, 1991

[54] THIN-LAYER EVAPORATOR FOR HIGH-VISCOSITY, FLUIDS

[75] Inventors: Mauro Loconsolo, Porto Mantovano; Claudio Buonerba, Mantova; Antonio Fucile, Caserta; Francesco Ferrari, Virgilio, all of Italy

[73] Assignee: Montedipe S.p.A., Milan, Italy

[21] Appl. No.: 423,741

[22] Filed: Oct. 19, 1989

Related U.S. Application Data

[63] Continuation of Ser. No. 116,149, Nov. 3, 1987, abandoned.

[30] Foreign Application Priority Data

Nov. 4, 1986 [IT]  Italy ................................ 22224 A/86

[51] Int. Cl.$^5$ .............................................. B01D 1/22
[52] U.S. Cl. .................................. 159/6.1; 159/13.1; 159/25.1; 159/49; 159/DIG. 10; 202/175; 202/237; 202/265; 202/236
[58] Field of Search .......... 159/25.1, 6.1, 49, DIG. 10, 159/13.1; 202/236, 237, 175, 265; 203/89; 165/914, 115

[56] References Cited

U.S. PATENT DOCUMENTS

| | | | |
|---|---|---|---|
| 2,831,665 | 4/1958 | Baerfuss | 159/6.2 |
| 2,838,107 | 6/1958 | Bridges et al. | 159/6.2 |
| 2,927,634 | 3/1960 | Gudheim | 159/6.2 |
| 2,955,990 | 10/1960 | Smith | 202/236 |
| 3,067,812 | 12/1962 | Latinen et al. | 202/236 |
| 3,107,194 | 10/1963 | Bechtler | 159/6.2 |
| 3,180,399 | 4/1965 | Belcher et al. | 159/6.2 |
| 3,199,575 | 8/1965 | Keller | 202/236 |
| 3,316,958 | 5/1967 | Johnston | 159/6.2 |
| 3,590,916 | 7/1971 | Mutzenberg | 159/6.2 |
| 3,678,983 | 7/1972 | Widmer et al. | 159/6.2 |
| 3,679,368 | 7/1972 | Balint et al. | 159/DIG. 10 |
| 3,695,327 | 10/1972 | Widmer | 159/6.2 |
| 3,812,897 | 5/1974 | Latinen | 159/13.2 |
| 3,848,289 | 11/1974 | Bachmann | 159/6.2 |
| 4,054,485 | 10/1977 | Linder et al. | 159/6.2 |
| 4,093,479 | 6/1978 | Baird | 159/13.2 |
| 4,208,243 | 6/1980 | Knotik et al. | 159/6.2 |

FOREIGN PATENT DOCUMENTS 1168269  7/1985  U.S.S.R. ................ 159/6.2

*Primary Examiner*—Virginia Manoharan
*Attorney, Agent, or Firm*—Morgan & Finnegan

[57] ABSTRACT

A thin-layer evaporator particularly suited for treating high-viscosity fluids, including a treating chamber surrounded by a heating or cooling shell, and a rotor equipped with feed and thrust elements. The feed and thrust elements include at least two axial, equidistant and staggered rows of blade members having the same pitch and sloping with respect both to the rotor axis and to the axial plane passing through their connection line; each member being offset, with respect to the members of the adjacent rows, by a space equal to the half pitch of the member.

8 Claims, 4 Drawing Sheets

THIN-LAYER EVAPORATOR FOR HIGH-VISCOSITY, FLUIDS

This application is a continuation of application Ser. No. 116,149, filed Nov. 3, 1987 now abandoned.

DESCRIPTION OF THE INVENTION

This invention relates to a thin-layer evaporator for the treatment of high-viscosity fluids.

More particularly, the present invention relates to a thin-layer evaporator for the treatment of high-viscosity fluids, wherein the removal of the volatile matters by means of evaporation is carried out under such conditions as to prevent the degradation of the material and the decay of its physical and mechanical properties.

The term "high-viscosity fluids", whenever used in the present description and in the claims, comprises products having a viscosity—under the treatment conditions—even higher than 50,000 poises, such as, for example, the products obtained from polymerization processes, in particular from bulk polymerization or from polymerization in a solution of ethylenically unsaturated monomers and from polymerization by polycondensation, such products containing, besides the polymers, high amounts of volatile matters, such as residual monomers, organic solvents and the like.

There are known, and are used in the industry, various types of apparatus for the evaporation of volatile matters by means of the thin-layer technique. Such apparatus generally consists of a cylindrical body or treating chamber surrounded by a heating or cooling shell, and of a rotor, which is arranged inside said cylindrical body and is coaxial with it.

The rotor is generally equipped with spreading means which spread the viscous fluid in a thin layer on the inner wall of said treatment chamber, and with feed means, which push the material undergoing treatment towards the discharge.

Thus, for example, British Patent No. 940,655 describes a rotor consisting of a cylindrical shaft on which rows of sloping blades are fixed, the free edges thereof being very close to the inner surface of the treatment chamber and their distance from said surface being of the order of 1 mm, depending on the properties of the treated fluid.

With such types of evaporators, the obtainable filling volume of the treatment chamber are equal to 10-30% of the geometrical volume.

Italian Patent No. 898,633 describes a rotor composed of a cylindrical shaft on which two kinds of blades are fixed: axially developed blades, which act as spreading means, and blades which are sloping with respect to the rotor axis, according to the direction of rotation thereof and according to an imaginary helicoidal line, said latter blades acting as feed or thrust means for the material to be treated. During the operation of such an evaporator, the viscous fluids, after introduction into the treating chamber, are taken up by the axially developed blades and are laid in the form of a thin layer on the inner surface of the treating chamber. The subsequent blades cause the viscous fluid to move forward on the treatment surface till reaching the discharge. The simultaneous presence of the two types of blades is an essential condition for the treatment of high-fluidity materials.

The thin-layer evaporators of the above-cited types have not proved to be suitable for the evaporation of high-viscosity fluids, especially when a very high removal of the volatile matters is required. That is mainly due to the fact that phenomena of material degradation are generated due to the high viscous dissipation and/or to the long residence time in the evaporator of the fluid to be treated.

Various attempts to obviate such drawbacks by raising or lowering the treatment temperature have not led to satisfactory results, as a temperature increase in the treatment chamber involves a more sensible thermal degradation of the material; conversely, a temperature lowering causes an increase in the viscosity of the fluid and, in consequence, a considerably more mechanical degradation.

In fact, it is known that the degradation of the materials endowed with heat-sensitive properties is dependent on the residence time in the treatment chamber, on the viscous dissipations, and on the treatment temperature, as is described in Polymer Engineering and Science, Mid. August 1978, Vol. 18, No. 10, pages 812-816.

Another area of the known evaporators in which the material degradation due to heat occurs to a higher degree, particularly in the case of high-viscosity fluids, is the discharge or outlet area. In fact, such area has generally the shape of a truncated cone, wherein outlet means are arranged which consist of blades oriented in such manner as to mix the product during the discharge step and to convey it towards the outlet nozzle. The presence of a material filling volume, although useful to obtain low concentrations of volatile matters, involves an increase in the material degradation. It is also known to arrange a screw device in the generally truncated cone-shaped outlet area: in this case, however, the high pressures to which the material is subjected generate an amount of energy which, due to viscous dissipation, causes phenomena of material degradation.

It is an object of the present invention to provide a thin-layer evaporator which is free from the above-mentioned shortcomings, especially in the case of the treatment of highly viscous fluids.

It has now been discovered (in accordance with the present invention) that the evaporation of volatile matters from a viscous fluid may be carried out under conditions of low transfer of thermal and mechanical energy, by using a thin-layer evaporator comprising a treatment chamber surrounded by a heating or cooling shell, and a rotor arranged inside said chamber and coaxial with it, in which the rotor is equipped with a type of blade members exerting only the actions of feeding, thrusting and spreading, and sloping with respect both to the rotor axis and to the axial plane passing through their connection line, said members being arranged in at least two axial, equidistant and staggered rows and having the same pitch, and each member of each row—viewed in the axial direction—being staggered, with respect to the corresponding members of the adjacent rows, by a space equal to the half pitch of the members.

Preferably, the blade members are sloping by the same angle with respect to the rotor axis, with each member being sloping with respect to the axial plane passing through their connection line, by an angle which is variable along the height of each member.

Furthermore the rotor is preferably equipped with blade members also in the area corresponding to the area above the nozzle which feeds the fluid to be treated, in order to prevent the fluid from being entrained and from flowing out.

The pitch of the blade members may have any desired value, although the preferred pitch is equal to the half height of the projection of a blade member on the axis of rotation.

According to the present invention, furthermore, the discharge zone consists of a truncated cone-shaped chamber which houses a rotor equipped with blade members having preferably the same slopings, arrangements and characteristics as those of the treatment chamber.

The fact that all the blades are sloping and that the sloping is always of the same value with respect to the rotor axis makes it possible that the fluid to be treated is continuously removed from the walls, renewed and conveyed to the outlet, thereby minimizing the residence time and, in consequence, avoiding any material stagnation. Furthermore, the arrangement of each blade with respect to the corresponding blades of the adjacent rows permits one to remove, to spread and to push away as quickly as possible all the material accumulated at the discharge end of each blade. It follows that the blades act on the whole mass to be treated, particularly and intensively on the mass of accumulated material, by spreading said mass on the walls and by removing it continuously in order to avoid a long residence time and consequent stagnation of same.

The present invention will be still better understood from the following detailed description, in which reference is made to the figures of the annexed drawing, which represent a preferred illustrative but not limitative embodiment thereof, and in which:

Figure 1:
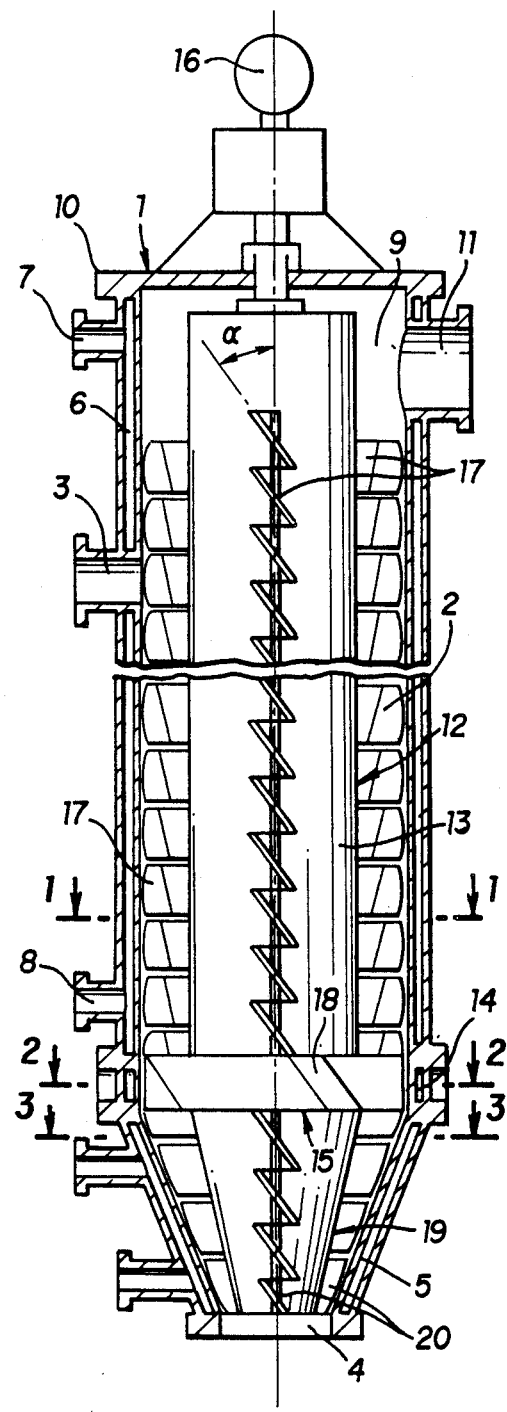
FIG. 1 is a schematic view of an axial section of the thin-layer evaporator according to the invention.
Figure 2:
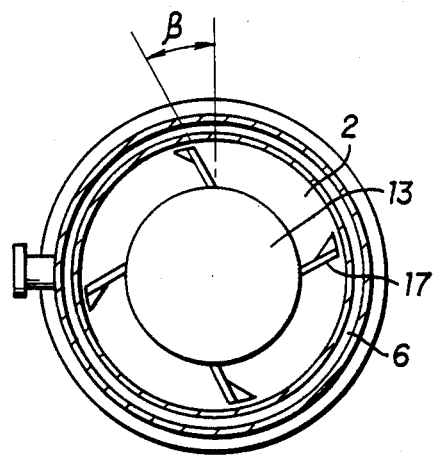
FIG. 2 is a schematic view of the cross section obtained by a plane passing through line 1—1 in FIG. 1.

Referring in particular to the figures, the thin-layer evaporator, generally indicated by 1, comprises a treatment chamber 2, which is symmetrical with respect to rotation, is substantially arranged in the vertical direction and is equipped with an inlet nozzle 3, arranged in the upper portion, and with an outlet nozzle 4, arranged at the end of the lower portion coaxially with respect to chamber 2. Outlet nozzle 4 is connected with chamber 2 by a truncated conical body 5. Treating chamber 2 is surrounded by a shell 6 equipped with inlet nozzles 7 and with outlet nozzles 8 for circulating a heating or cooling fluid, such as oil, water, etc.

Also the truncated conical body 5 is surrounded by a heating or cooling jacket with appropriate inlet and outlet nozzles for the heating or cooling medium.

Connected to the upper end of treating chamber 2 is a chamber 9 for the collection of the fumes and vapors which are generated during the evaporation treatment. Said chamber 9 has a diameter generally equal to that of treatment chamber 2 and is coaxial with respect to this chamber. The upper portion of chamber 9 is closed by a cover 10 and is equipped with a nozzle 11 for discharging vapors and fumes.

Coaxially with respect to treatment chamber 2 and to fumes collection chamber 9, and in the inside thereof, there is arranged a rotor 12 which extends substantially over the entire length of said chamber 2 and 9.

Rotor 12 comprises a central shaft 13 rotatably supported in the upper portion by cover 10 and, in the lower portion, on the inner wall of treatment chamber 2 by means of a centering sleeve 14 and a guiding sliding block 15. A motor 16, fixed in the upper outer portion of cover 10, causes the rotation of the central shaft 13.

The portion of shaft 13 which extends from the upper area of the chamber defined by inlet nozzle 3 down to the centering sleeve 14 is equipped with blade members 17 arranged in at least two, preferably eight, equidistant, staggered rows, which extend along the axis of chamber 2.

Each blade member 17 is sloping with respect to both the rotor axis and the axial plane passing through their connection line to shaft 13. In particular, angle alpha formed with the rotor axis ranges from 10° to 75°, while angle beta formed with said axial plane ranges from 5° to 90°, and preferably from 10° to 60°. Preferably, angle beta is variable, in the above-mentioned range, along the free edge of blade members 17. In particular, from the feeding area to the discharge area of each extension, said variation decreases in the upper half and increases in the lower half.

Blade members 17 are fixed with the same pitch on each row, and each blade member of each row, viewed in the axial direction, is staggered, with respect to the corresponding blade members of the adjacent rows, by a space equal to the half pitch of the members and, preferably, to the half height of the blade member projection on the axis of rotation.

The position of blade members 17 is such as to continuously push the viscous fluid to be treated from inlet nozzle 3 to discharge nozzle 4 and, at the same time, to spread it in a thin film on the inner walls of the treatment chamber 2. In this way, the viscous fluid to be treated is continuously renewed and conveyed towards discharge nozzle 4, thereby preventing any residence or stagnation of the fluid in any area of chamber 2.

Blade members 17 extend up to above inlet nozzle 3, in order to prevent the fed viscous fluid from rising over said nozzle 3 in the form of foam, droplets or in any other form depending on the specific rheological behavior of the fluid to be treated.

Figure 3:
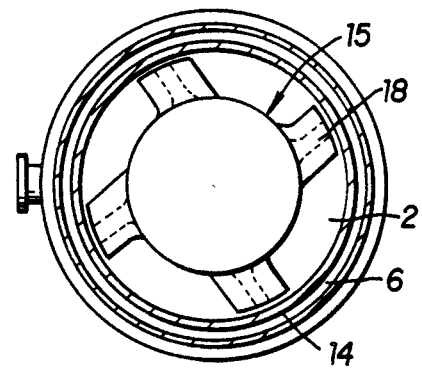
FIG. 3 is a schematic view of the cross section obtained by a plane passing through line 2—2 in FIG. 1.

Guiding sliding block 15 includes on its outer peripheral surface at least four guiding blade members 18 having preferably the same shape and the same slopings as members 17 of the rotor, but a surface adapted to slide on the film of material preferably greater than double those of members 17. Furthermore, the distance of the sliding surface of each guiding member 18 from the inner surface of centering sleeve 14 is less than the distance of members 17 from the inner surface of chamber 2, in order to permit shaft 13 to exert a guiding action during rotation. See FIG. 3. The angular distance between guiding blade members 18 is adjusted in order to allow a free flow of the material to discharge nozzle 4.

Figure 4:
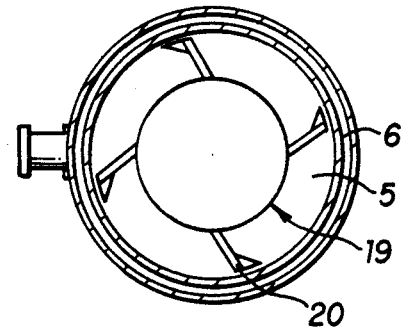
FIG. 4 is a schematic view of the cross section obtained by a plane passing through line 3—3 in FIG. 1.
Figure 6:
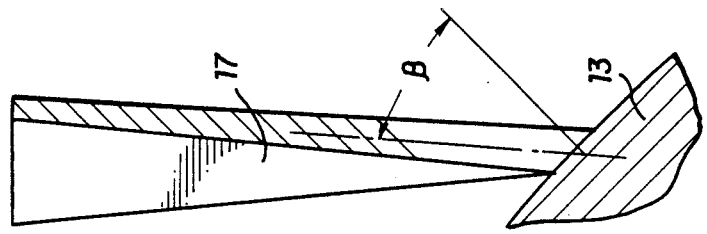
FIG. 6 is a schematic view of the cross-section obtained by a plane passing along line A in FIG. 5.
Figure 7:
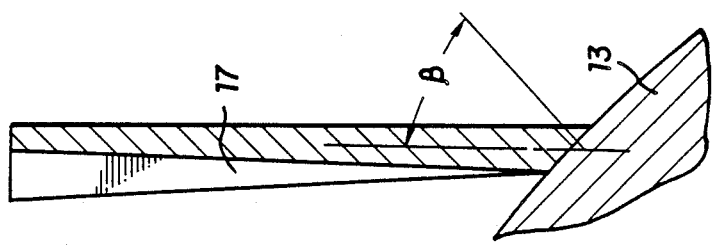
FIG. 7 is a schematic view of the cross-section obtained by a plane passing along line B in FIG. 5.
Figure 8:
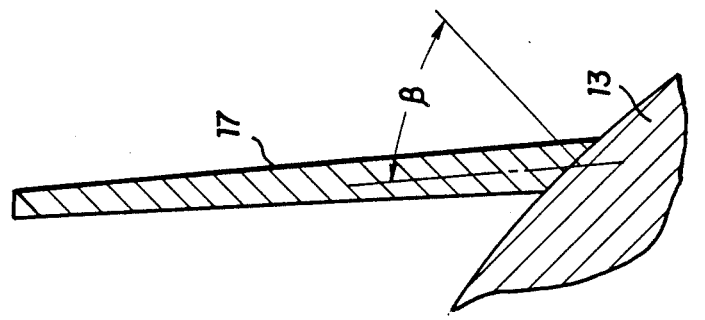
FIG. 8 is a schematic view of the cross-section obtained by a plane passing along line C in FIG. 5.
Figure 5:
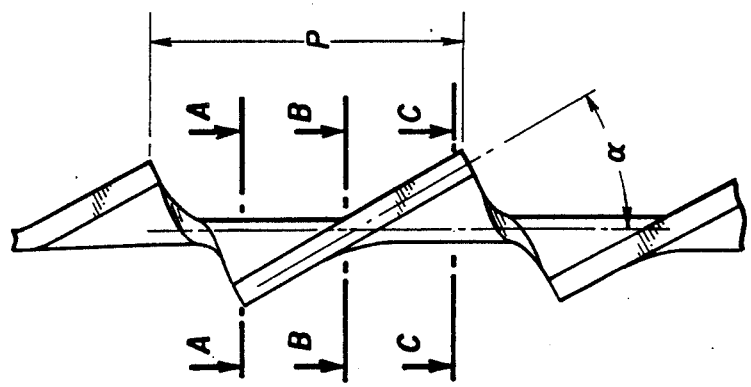
FIG. 5 is a schematic close-up view of a section of the rotor shown in FIG. 1.
Figure 9:
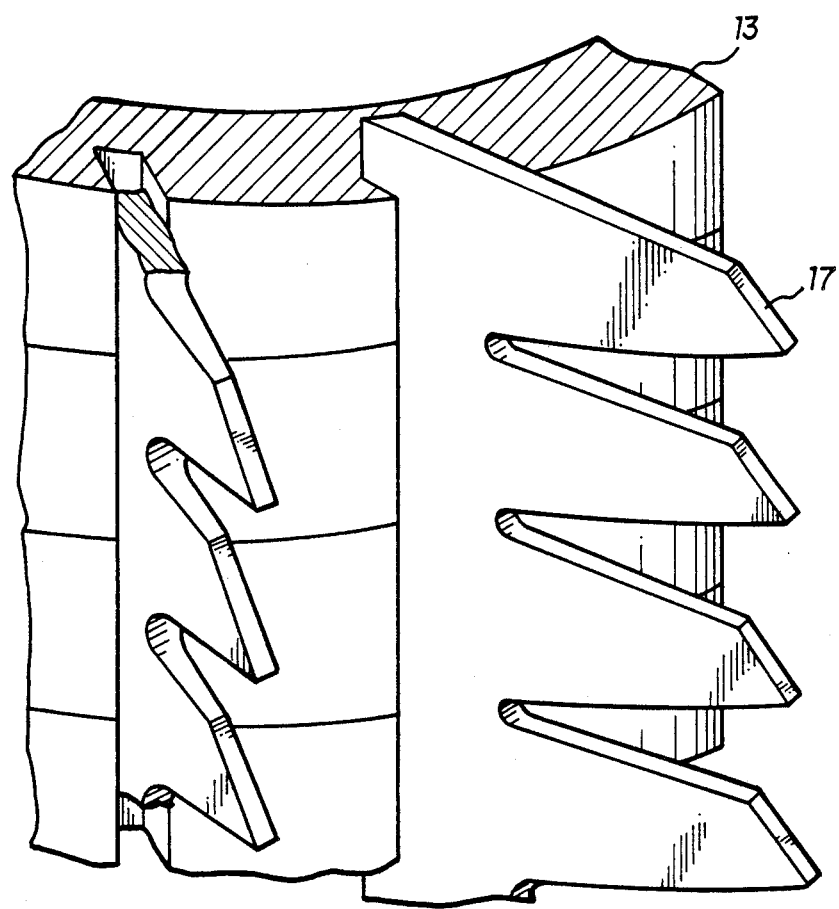
FIG. 9 is a perspective view of the thin-layer evaporator of the present invention.

A further rotor 19 (see FIG. 4) is mounted in truncated cone-shaped body 5, said rotor being equipped with blade members 20 similar to those, 17, of rotor 12 of treatment chamber 2, but tapered at the free end, preferably following the profile of the inner surface of the truncated cone-shaped body 5.

The function of the rotor 19 is that of conveying the viscous material, in the form of a thin layer, towards the discharge, namely nozzle 4, in order to avoid the filling of the evaporator bottom or the transfer of mechanical energy to the material, with consequent degradation thereof.

Rotor 19 may be connected with upper rotor 12 and therefore it can be driven by the same motor 16, or, as an alternative, rotor 19 may be keyed on sliding block 15 and driven by a separate motor.

Evaporator 1 operates as follows: The viscous fluid to be treated is introduced into treating chamber 2 through nozzle 3, and is heated or cooled as desired by shell 6, etc., and caught by blade members 17. These blade members 17 distribute the viscous fluid in the form of a thin layer along the inner wall of treating chamber 2 and simultaneously push it in the direction of discharge nozzle 4. As soon as blade members 17 take up the fluid by means of their edges, they push it forward and spread it in the form of a layer on the wall of chamber 2. The fluid which accumulates at the lower edges of said blade members 17 is immediately taken by the blade members of the rows which directly follow and, in turn, is conveyed and spread in a thin layer on the walls of chamber 2. This operation is repeated over the whole inner surface of the evaporator until the fluid reaches the lower end of rotor 12. The fluid being treated is then made to flow to blade members 18 of guiding sliding block 15. Discharge rotor 19 pushes the treated material, in a thin layer, towards discharge nozzle 4 for further treatment.

The fumes and vapors generated during the fluid treatment rise, in countercurrent with respect to the fluid, up to chamber 9 and, after separation from liquid or solid material, if any, are discharged from discharge nozzle 11 into a condenser or other suitable apparatus.

The evaporator of the present invention permits one to attain a substantial and efficient utilization of the entire inner surface of the chamber, thus preventing the fluid from accumulating and stagnating in any area of said chamber. This is due to the fact that all blade members 17 act simultaneously both as spreading means and as thrust or feed elements for the fluid.

With the features of the thin-layer evaporator of the present invention, it is possible to satisfactorily treat heat-sensitive and thermodegradable fluids having very high viscosities, e.g., from 50,000 to 100,000 poises, such as for example the products obtained from the bulk polymerization of polymerization products such as polystyrene, polycarbonate, ABS, SAN, polymethyl methacrylate, styrene copolymers, etc.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims.

What is claimed is:

1. In a thin-layer evaporator for high-viscosity fluids comprising a treating chamber surrounded by a heating or cooling shell, and a rotor arranged inside said chamber and coaxial with it, said rotor comprising blade members which are sloping by the same angle with respect to the rotor axis and are arranged in at least two axial, equidistant and staggered rows, said blade members having the same pitch, the improvement wherein each blade member is sloping with respect to the axial plane passing through its connection line by an angle beta ranging from 5° to 90° and wherein the blade members of each row, viewed in the axial direction, are offset, with respect to the nearest blade member of the adjacent row, by a space equal to the half pitch of the blade members whereby evaporation of high-viscosity fluid is achieved without use of auxiliary spreading means and without thermal degradation to the fluid 2. The thin-layer evaporator according to claim 1, wherein the angle beta by which each blade member is sloping, with respect to the axial plane passing through its connection line varies along its height.

3. The thin-layer evaporator according to claim 1, wherein the blade members are sloping by an angle ranging from 10° to 75° with respect to the rotor axis.

4. The thin-layer evaporator according to claim 1, wherein the angle of the blade members with respect to the axial plane is variable along the free edge of each member, and its value, from a feeding area to a discharge area of each blade member is decreasing in the upper half and increasing in the lower half of each member.

5. The thin-layer evaporator according to claim 1, wherein the pitch of the blade members is equal to half the height of the projection of a blade member on the axis of rotation.

6. The thin-layer evaporator according to claim 1, wherein the rotor further comprises a central shaft, which is rotatably mounted, in the upper portion, on an evaporator cover and, in the lower portion, on an inner wall of the treatment chamber by means of a centering sleeve and a guiding sliding block.

7. The thin-layer evaporator according to claim 6, wherein the guiding sliding block further comprises, on its outer peripheral surface, at least four blade members having the same shape and the same slopings as the blade members of the rotor and a sliding surface at least double as compared with that of each blade member of the rotor.

8. The thin-layer evaporator according to claim 1, wherein the blade members are sloping by an angle beta ranging from 10° to 60° with respect to the axial plane passing through their connection line.

* * * * *